US008300864B2

(12) United States Patent
Müllenborn et al.

(10) Patent No.: US 8,300,864 B2
(45) Date of Patent: Oct. 30, 2012

(54) HEARING AID SYSTEM WITH A LOW POWER WIRELESS LINK BETWEEN A HEARING INSTRUMENT AND A TELEPHONE

(75) Inventors: Matthias Müllenborn, Smørum (DK); Morlen Kjær Johansen, Smørum (DK)

(73) Assignee: Oticon A/S, Smorum (DK)

( * ) Notice: Subject to any disclaimer, the term of this patent is extended or adjusted under 35 U.S.C. 154(b) by 369 days.

(21) Appl. No.: 12/474,860

(22) Filed: May 29, 2009

(65) Prior Publication Data
US 2009/0296967 A1  Dec. 3, 2009

(30) Foreign Application Priority Data
May 30, 2008 (EP) .................................. 08104183

(51) Int. Cl.
*H04R 25/00* (2006.01)
(52) U.S. Cl. ......... 381/315; 381/312; 381/316; 455/425
(58) Field of Classification Search .................. 381/315, 381/312, 316
See application file for complete search history.

(56) References Cited

U.S. PATENT DOCUMENTS

| 174,465 | A | * | 3/1876 | Bell .................. 379/167.01 |
| 5,771,438 | A |   | 6/1998 | Palermo et al. |
| 2003/0044033 | A1 | * | 3/2003 | Julstrom et al. .............. 381/315 |
| 2005/0111682 | A1 |   | 5/2005 | Essabar et al. |
| 2005/0117764 | A1 | * | 6/2005 | Arndt et al. .................... 381/315 |
| 2005/0244022 | A1 |   | 11/2005 | Muthuswamy et al. |
| 2005/0255843 | A1 |   | 11/2005 | Hilpisch et al. |
| 2008/0102906 | A1 | * | 5/2008 | Dijkstra et al. ............ 455/575.2 |

FOREIGN PATENT DOCUMENTS

| EP | 0 872 032 B1 | 10/1998 |
| EP | 1 460 769 A1 | 9/2004 |
| EP | 1 903 755 A2 | 3/2008 |
| WO | WO-2006/117365 A1 | 11/2006 |

* cited by examiner

*Primary Examiner* — Jerome Jackson, Jr.
*Assistant Examiner* — Dale E Page
(74) *Attorney, Agent, or Firm* — Birch, Stewart, Kolasch & Birch, LLP

(57) ABSTRACT

The invention relates to wireless communication between listening devices, in particular to a hearing aid system comprising a hearing instrument and a telephone apparatus. The invention further relates to a method of receiving a telephone call and to the use of a hearing aid system. The object of the present invention is to provide a relatively simple, reliable scheme for receiving a telephone call in a hearing instrument. The problem is solved in that the telephone apparatus comprises a transmitter for establishing a short range digital, low-power link to a hearing instrument comprising a corresponding receiver. This has the advantage of providing a relatively simple and low power solution, where at least the incoming part of a telephone conversation is wirelessly transmitted via a low-power link. The invention may e.g. be used for the communication between a hearing instrument and a telephone, where a standard wireless interface for local connectivity, such as a Bluetooth interface, is not technically feasible or not available for other reasons.

23 Claims, 2 Drawing Sheets

| HEADER | AUDIO PAYLOAD | END |

HEARING AID SYSTEM WITH A LOW POWER WIRELESS LINK BETWEEN A HEARING INSTRUMENT AND A TELEPHONE

TECHNICAL FIELD

The invention relates to wireless communication between listening devices. The invention relates specifically to a hearing aid system comprising a hearing instrument and a telephone apparatus.

The invention furthermore relates to a method of receiving a telephone call in a hearing instrument adapted for being worn in or at an ear of a user from a remote telephone apparatus via a local telephone apparatus adapted for being held by the user.

The invention furthermore relates to use of a hearing aid system.

The invention may e.g. be useful in applications such as communication between a hearing instrument and a telephone, where a standard wireless interface for local connectivity, such as a Bluetooth interface, is not technically feasible or not available for other reasons.

BACKGROUND ART

Number two priority for hearing impaired people is to improve the listening situation when talking into a phone (number one priority being to improve direct voice or sound inputs in noisy listening situations).

Various intermediate devices, which handle the communication between a mobile telephone and a hearing aid, by providing a Bluetooth link to the mobile phone, have been defined. Examples of such devices are e.g. described in EP 1 460 769 A1 and WO 2006/117365 A1. However, landline and cordless telephones do typically not have Bluetooth capabilities. Furthermore, intermediate devices are not wanted by the end user as they have to be carried at all times (in addition to the hearing instruments and the phone) and can be complicated to set up and use (involving Bluetooth pairing, setup, call answering, switching mode, etc.).

Most hearing instruments support the use of a telecoil picking up the sound from the receiver of a phone. This solution does, however, not provide good sound quality and is prone to interference.

EP 0 872 032 B1 describes a short range communication system using inductive communication between a base unit and a portable unit allowing for two way communication between them. The base unit can e.g. be a mobile telephone or a handset of a cordless telephone system. The portable unit can e.g. be a headset.

EP 1 903 755 A2 describes a mobile wireless device which uses a magnetic coil equipped in a vibration motor for generating a hearing aid-compatible magnetic signal without requiring an additional T-coil.

DISCLOSURE OF INVENTION

The problem of the prior art is that the solutions are either relatively complex requiring additional power consuming communications interfaces (e.g. Bluetooth) or prone to interference (receiver to telecoil communication). The high power consumption of prior art solutions with acceptable audio performance makes it practically impossible to integrate the respective wireless interfaces into hearing instruments directly.

An object of the present invention is to provide a relatively simple, reliable scheme for receiving a telephone call in a hearing instrument.

Objects of the invention are achieved by the invention described in the accompanying claims and as described in the following.

An object of the invention is achieved by a hearing aid system comprising a hearing instrument and a telephone apparatus, the telephone apparatus comprising a transmitter for establishing a short range digital, low-power link to a hearing instrument comprising a corresponding receiver.

This has the advantage of providing a relatively simple and low power solution where at least the incoming part of a telephone conversation is wirelessly transmitted via a low-power link.

In an embodiment, the short range digital, low-power link is implemented by corresponding transceivers in the hearing instrument and telephone apparatus, respectively, each comprising antenna, modulation, driver, receiver and demodulation circuitry. A digital link is in general packet based, in that data to be transmitted (audio payload) is enclosed in packets comprising a packet header (comprising e.g. a frame start flag, a packet size parameter, a frame descriptor, a packet address), an audio payload and a packet end field (comprising e.g. a frame check sequence, and end frame flag). Preferably the link transmission range is above the audio baseband frequency range, e.g. above 50 kHz, e.g. in the range from 100 kHz to 1 GHz.

In an embodiment, the hearing instrument comprises a telecoil for receiving an (magnetically induced) electrical input in the audio base band from a corresponding telecoil. The telecoil is a separate component from the antenna of the short range digital, low-power link.

Embodiments of the invention have one or more of the following advantages compared to links based on telecoil and audio base band transmission: Robust data transmission, specific addressing of the receiver (no unintended transmission, no eavesdropping, no interference, privacy, encryption, unicasting and multicasting possible, e.g. streaming to two hearing instruments at the same time), possibility of exchanging data, settings, link management, etc.

In an embodiment, the system is adapted to automatically activate an appropriate hearing instrument program (e.g. a combination of parameter settings specifically optimized to the telephone signal, e.g. to its frequency range) when a signal from the telephone apparatus is received.

The term 'low-power' is in the present embodiment taken to mean that the receiver of the hearing instrument consumes less than half of the power of the hearing instrument, when active, such as less than 20% of the power.

The term 'telephone apparatus' is in the present context taken to mean a wired, stationary line telephone apparatus, a cordless telephone apparatus or a cellular telephone apparatus. The present invention is particularly relevant for wired, stationary line or cordless telephone apparatuses.

In an embodiment, the system is adapted to provide an inductive link between the transmitter and the receiver.

According to the invention, cooperating wireless modules, each comprising an inductive transceiver, are included in an ordinary, wired telephone or a cordless telephone (e.g. a DECT phone, DECT=Digital Enhanced Cordless Telecommunications) and a hearing instrument, respectively. Thereby a wireless, inductive link can be established between the telephone and the hearing aid. The wireless module of the telephone can e.g. convert an analogue audio signal into a digital wireless audio stream. This digital audio stream can be transmitted in a robust way with greatly reduced interference compared to telecoil solutions, which apply simple amplitude modulation.

In its most efficient form, the inductive link is unidirectional from the telephone to the hearing instrument. In this embodiment, the telephone only needs an inductive transmitter and the hearing instrument only needs an inductive receiver (e.g. utilizing an induction coil). The system of this embodiment works e.g. in the following manner: If a hearing instrument with an appropriately adapted receiver gets into the range of a telephone equipped with the appropriate inductive transmitter (e.g. ~10-20 cm from the ear), the hearing instrument is adapted to receive and play the sound from the telephone directly into the ear of the wearer of the hearing instrument. The microphone of the telephone is used in a conventional way for picking up the sound of the wearer's voice.

Alternatively, the link can be bi-directional in that the hearing instrument further comprises a transmitter for establishing a short range digital, low-power link to the telephone apparatus further comprising a corresponding receiver.

It has been demonstrated that sound can be received in both ears of a binaural system with such a solution, providing excellent sound quality. There are no additional devices involved (no intermediate audio selection devices) and no special installation and/or pairing processes have to be performed. Therefore, this system provides an easy and intuitive use.

In an embodiment, the system is adapted to establish the link when the telephone apparatus and the hearing instrument are brought within a predetermined distance from each other. In an embodiment, the predetermined distance is smaller than 0.30 m, such as smaller than 0.25 m, such as smaller than 0.20 m, such as smaller than 0.15 m.

In an embodiment, the system is adapted to establish the link when the telephone apparatus and the hearing instrument are brought within a predetermined range of distances from each other, such as in the range from 0.05 m to 0.30 m, such as in the range from 0.10 m to 0.20 m.

The inductive communication between the telephone apparatus and the hearing instrument can be arranged according to any appropriate standard or format, proprietary or public. Preferably, the communication is arranged via a near-field, inductive, digital, ultra-low power short range wireless link. In a preferred embodiment, the communication between the telephone apparatus and the hearing instrument is arranged according to a communications standard codec, such as G.722 (CCITT G.722 Wideband Speech Coding Standard, the CCITT G.722 wideband speech coding algorithm supporting bit rates of 64, 56 and 48 kbps). Alternatively, other proprietary or public standards could be used, e.g. Oticon's EarStream, Siemens' TekConnect, and Phonak's iCom technologies.

In a preferred embodiment, the system is adapted to provide a low-latency wireless link, such as a link having a delay from the telephone apparatus to the hearing instrument smaller than 30 ms, such as smaller than 20 ms, such as smaller than 10 ms. This can e.g. be achieved by minimizing overhead in the transmission protocol, avoiding or minimizing coding complexity, avoiding or minimizing buffering, and/or avoiding or minimizing error correction.

In a preferred embodiment, the system is adapted to provide a wireless link based on digital wireless technology. This has the advantage of providing good audio quality and privacy.

In a preferred embodiment, the system is adapted to provide a wireless link that has instant/simple pairing between the telephone and the hearing instrument. A short range of the wireless link (e.g. when implemented by inductive communication, and/or by keeping transmission power low) guarantees the privacy; therefore, pairing can be made more simple, e.g. using generic, in advance agreed, addresses.

In a preferred embodiment, the system is adapted to provide automatic volume adjustment. In an embodiment, the system is adapted to use the volume settings of the hearing instrument, either manually or automatically set.

In a preferred embodiment, the system is adapted to function without any user input (i.e. in a hands-free mode). This can e.g. be achieved using a proximity detector adapted to provide that when the telephone apparatus is moved into range/proximity of the hearing instrument (or vice versa), the audio data stream from the telephone apparatus is detected and the hearing instrument input is switched to receive the audio data stream.

In an embodiment, the system comprises two hearing instruments of a binaural fitting. In an embodiment, the system is adapted to establish the low power, digital link to both hearing instruments of a binaural fitting. In an embodiment, the two hearing instruments of the binaural fitting are adapted to be capable of creating a wireless link between them for exchanging parameter settings ('synchronization') and possibly audio data between them.

In a preferred embodiment, the system is adapted to provide a wireless link that can multicast to at least two hearing instruments. In an embodiment, generic, in advance agreed, addresses are used, e.g. multicast addresses.

In a preferred embodiment, the system is adapted to provide a wireless link with transmission frequencies below 1 GHz. This has the advantage of being biocompatible (the electromagnetic radiation is not absorbed in the body, or at least only to an acceptable degree).

In a preferred embodiment, the system is adapted to provide a wireless link with a worldwide available carrier frequency. This can be achieved by using a combination of low field strength and low frequencies, in which a worldwide, generic limit exists for short-range devices, not requiring any licenses. In an embodiment, the system is adapted to use the frequency range from 148.5 kHz to 30 MHz for the transmission link. In an embodiment, the low power transmission link is adapted to use a field strength in the range from −50 dB μA/m in 10 m distance to −5 dB μA/m in 10 m distance.

In a preferred embodiment, the system is adapted to use a standardized wireless technology. In a preferred embodiment, the system is adapted to use a wireless technology that does not interfere with DECT (typically operating at frequencies around 1.9 GHz) and/or other standards.

In a preferred embodiment, the system is adapted to use a wireless technology with a relatively short acceptable transmission range. This has the advantage of preventing eaves dropping and channel crowding (the same frequency spectrum can be used by pairs of devices (telephone-hearing instrument) relatively close to each other, e.g. within meters of each other, e.g. at a distance of more than 2 m, such as more than 5 m from each other.

In a preferred embodiment, the system is adapted to use a private (proprietary) wireless technology (in contrast to telecoil).

In a particular embodiment, the system is adapted to provide that the link is unidirectional from the telephone apparatus to the hearing instrument.

A method of receiving a telephone call in a hearing instrument adapted for being worn in or at an ear of a user from a remote telephone apparatus via a local telephone apparatus adapted for being held by the user is furthermore provided by the present invention, the method comprising establishing a short range digital, low-power link from the local telephone apparatus to the hearing instrument for forwarding a sound signal from the remote telephone apparatus to the hearing instrument when the local telephone and the hearing instrument are positioned within a certain distance of each other. The method has the same advantages as the system outlined above. It is intended that the method can be combined with the same features as described for the system (appropriately converted to corresponding actions).

In a particular embodiment, the method is adapted to provide that the link is uni-directional from the telephone apparatus to the hearing instrument.

In a particular embodiment, the method is adapted to provide an inductive link between the transmitter and the receiver In a preferred embodiment, the method further comprises using a microphone of the local telephone apparatus for picking up a sound signal from the user and forwarding the sound signal from the user to the remote telephone apparatus. In this way, a good quality, two way telephone connection can be established, which enables a unidirectional link between the telephone apparatus and the hearing instrument, thereby saving power in the hearing instrument.

Use of a hearing aid system is moreover provided by the present invention.

Further objects of the invention are achieved by the embodiments defined in the dependent claims and in the detailed description of the invention.

As used herein, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements maybe present, unless expressly stated otherwise. Furthermore, "connected" or "coupled" as used herein may include wirelessly connected or coupled. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF DRAWINGS

The invention will be explained more fully below in connection with a preferred embodiment and with reference to the drawings in which.

The figures are schematic and simplified for clarity, and they just show details which are essential to the understanding of the invention, while other details are left out. Throughout, the same reference numerals are used for identical or corresponding parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

MODE(S) FOR CARRYING OUT THE INVENTION

Figure 1A:
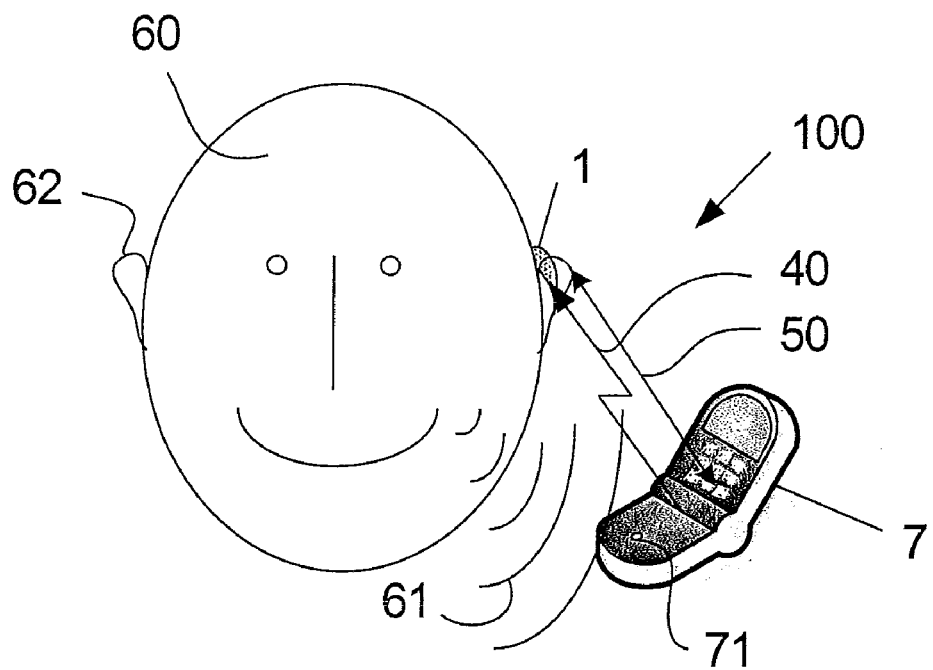
FIG. 1 shows a hearing aid system according to an embodiment of the invention, FIG. 1a illustrating a single hearing instrument solution and FIG. 1b a binaural solution.

FIG. 1 shows a hearing aid system 100 according to an embodiment of the invention. The system comprises a digital cordless telephone 7, e.g. a DECT telephone, and a hearing instrument 1, the telephone 7 comprising a transmitter for establishing a digital, short range, low power wireless communications link 40 to a receiver of the hearing instrument 1. The hearing instrument is worn by a user 60 in or (as here) behind an ear 62. The short range wireless link 40 can be established to support a telephone connection from the telephone 7 held by the user 60 in an appropriate (short range, e.g. $\leq 0.5$ m or $\leq 0.2$ m) distance 50 from the hearing instrument 1 to a remote apparatus, e.g. via a public telephone network. During the telephone conversation between the user 60 wearing the hearing instrument, any sounds 61 from the user is picked up by a microphone 71 of the telephone and treated in the normal way by the telephone (i.e. forwarded to a remote apparatus currently connected to the telephone 7 of the user 60). In this way, the short range link 40 between the telephone apparatus 7 and the hearing instrument 1 needs only be uni-directional, thereby requiring a minimum of power from the (typically battery driven) hearing instrument.

Figure 1B:
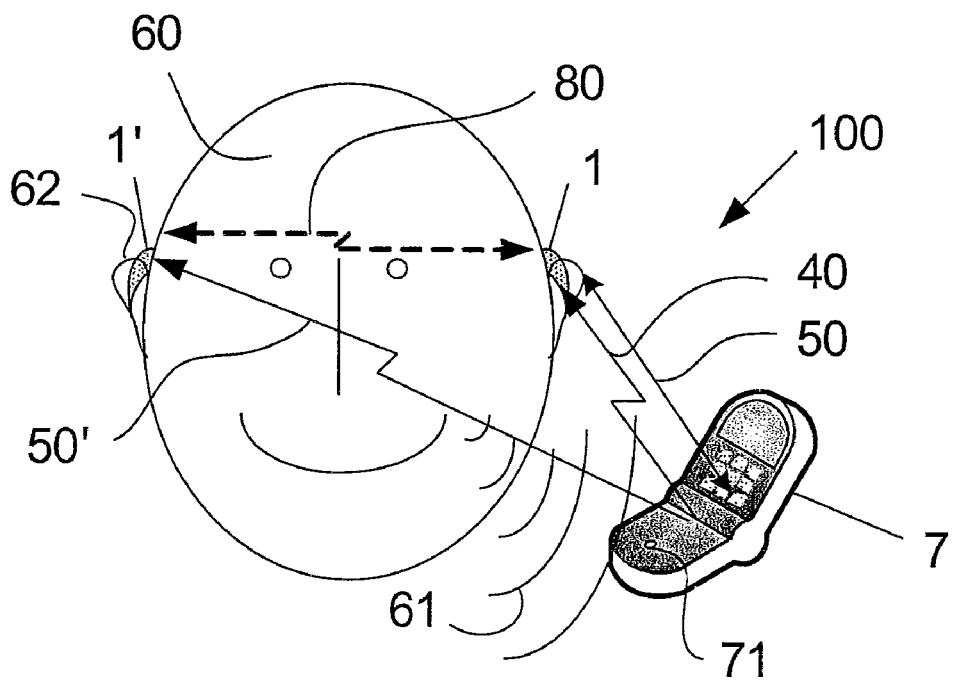

FIG. 1b shows a hearing aid system 100 according to another embodiment of the invention. The system of FIG. 1b deviates from the embodiment of FIG. 1a in that the system comprises two hearing instruments 1, 1' of a binaural fitting. The system of FIG. 1b is adapted to establish a low-power, digital link 50, 50' to both hearing instruments 1, 1' of the binaural fitting. In this embodiment, both hearing instruments 50, 50' comprise antenna and transceiver circuitry as described in connection with FIG. 2. In an embodiment, the two hearing instruments of the binaural fitting are adapted to be capable of creating a (e.g. wireless) link 80 between them for exchanging parameter settings ('synchronization') and possibly audio data between them. This inter-instrument link 80 may in an embodiment be an alternative to the direct link from the telephone apparatus 7 to the second hearing instrument 80', the signal from the telephone apparatus being forwarded from the first hearing instrument 50 to the second hearing instrument 50' via link 80.

In an embodiment, the radio link is based on 'EarStream', a low-power, inductive technology operating with a carrier frequency of 3.84 MHz using a raw data rate of 120 kbit/s and transmitting 10 kHz audio signals through a G.722 encoded link (as e.g. described in US 2005/0255843 A1). In a preferred embodiment, the receiver is integrated into a front-end integrated circuit with very few external components, e.g. a coil and two capacitors, and implemented with a simple architecture (for details, see e.g. US 2005/0111682 A1). The transmitter can be part of an integrated circuit as well or constructed with external standard components.

Figure 2:
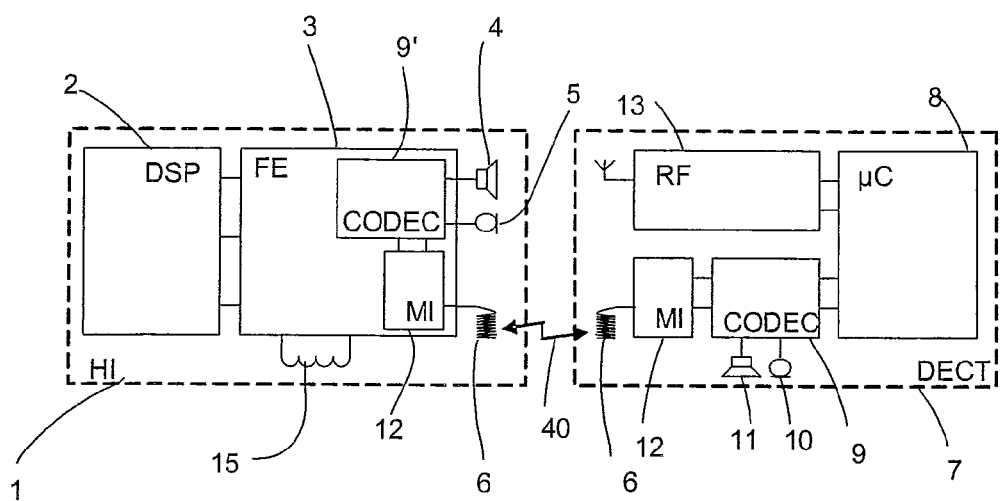
FIG. 2 shows a block diagram of a hearing aid system according to an embodiment of the invention.

FIG. 2 shows a block diagram of a hearing aid system according to an embodiment of the invention. The system comprises a hearing instrument 1 (HI in FIG. 2) and a digital cordless telephone 7, e.g. a DECT telephone. The hearing instrument comprises a digital signal processing chip (DSP) 2 and a front end (FE) chip 3. The front end chip provides input and output drivers for a speaker 4, a microphone 5 (cf. CODEC 9'), and transceiver circuitry 12 (MI) and an antenna 6 for a digital, short-range, low-power wireless communications link 40. In an embodiment, the short-range antenna 6 is a coil (as indicated in FIG. 2) for receiving and transmitting signals via coupled magnetic fields to a corresponding coil 6 in the telephone 7. In another embodiment, the system is adapted to be only able to receive (i.e. not transmit) in the hearing instrument. The telephone 7 comprises transceiver circuitry 12 (MI) of a digital short-range, low-power wireless communications link 40, a CODEC 9 for (possibly coding/decoding and) analog to digital conversion and including input and output drivers for a microphone 10 and a speaker 11. Furthermore, the telephone comprises a microcontroller (μC) 8 and an RF interface (RF), e.g. DECT, 13. In an embodiment the short-range link circuitry (MI) 12 is adapted to be only able to transmit (i.e. not receive). In an embodiment, the short-range transmitter consists of discrete components.

Figure 3:
FIG. 3 shows an exemplary packet structure of the digital, low-power link.

FIG. 3 shows an exemplary packet structure of the digital, low-power link. A transmitted audio payload is split in chunks enclosed in packets, each comprising a packet header (HEADER in FIG. 3)—a number of audio payload bits (AUDIO PAYLOAD in FIG. 3)—a packet end field (END in FIG. 3). In an embodiment, the packet header comprises a frame start flag, a packet size parameter, a frame descriptor, and a packet address. In an embodiment, a packet end field comprises a frame check sequence (e.g. to enable a CRC check in the receiver), and end frame flag. In an embodiment, a link protocol as described in US 2005/0255843 A1 is implemented.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims.

REFERENCES

EP 1 460 769 A1 (PHONAK) 22 Sep. 2004
WO 2006/117365 A1 (OTICON) 11 Sep. 2006
EP 0 872 032 B1 (AURA COMMUNICATIONS) 21 Oct. 1998
EP 1 903 755 A2 (SAMSUNG ELECTRONICS) 26 Mar. 2008
US 2005/0255843 A1 (Hilpisch et al.) 17 Nov. 2005
US 2005/0111682 A1 (STARKEY, OTICON) 26 May 2005

The invention claimed is:

1. A binaural hearing aid system comprising:
a first and second hearing instruments; and
a telephone apparatus, wherein the telephone apparatus comprises a transmitter for establishing a short range digital, low-power link to the first and second hearing instruments that each include a corresponding receiver,
the hearing aid system is configured to provide the wireless link for multicasting to said first and second hearing instruments,
the first and second hearing instruments of the binaural hearing aid system are configured to create an inter-instrument wireless link between the first and second hearing instruments for exchanging parameter settings and audio data, and
the inter-instrument link is an alternative to the direct link from the telephone apparatus to the first or second hearing instruments, the audio data of the signal from the telephone apparatus being forwarded from the first or second hearing instrument to the second or first hearing instrument via said inter-instrument link.

2. A hearing aid system according to claim 1 wherein the link from the telephone apparatus to the first and second hearing instruments is an inductive link.

3. A hearing aid system according to claim 1 wherein the system is adapted to establish the link from the telephone apparatus to one of the first or second hearing instruments when the telephone apparatus and one of the first and second hearing instruments are brought within a predetermined distance from each other.

4. A hearing aid system according to claim 3 wherein the predetermined distance is smaller than 0.30 m.

5. A hearing aid system according to claim 1 wherein the telephone apparatus is a digital cordless telephone apparatus.

6. A hearing aid system according to claim 1 wherein the telephone apparatus is a wired, fixed line telephone apparatus.

7. A hearing aid system according to claim 1 wherein the system is adapted to provide that the link is uni-directional from the telephone apparatus to at least one of the first and second hearing instruments.

8. A hearing aid system according to claim 1 wherein the link from the telephone apparatus to the first and second hearing instruments is a low-latency wireless link.

9. A hearing aid system according to claim 1 wherein the link from the telephone apparatus to the first and second hearing instruments is a wireless link based on digital wireless technology providing transmission of audio data in packets according to a wireless transmission protocol.

10. A hearing aid system according to claim 1 wherein the link from the telephone apparatus to the first and second hearing instruments is a wireless link that has instant/simple pairing between the telephone and the hearing instrument.

11. A hearing aid system according to claim 1 adapted to provide automatic volume adjustment.

12. A hearing aid system according to claim 1 adapted to function without any user input.

13. A hearing aid system according to claim 1 wherein the link from the telephone apparatus to the first and second hearing instruments is a wireless link with transmission frequencies above 50 kHz and below 1 GHz.

14. A hearing aid system according to claim 1 wherein the link from the telephone apparatus to the first and second hearing instruments uses the frequency range from 148.5 kHz to 30 MHz for the transmission link.

15. A hearing aid system according to claim 1 wherein the link from the telephone apparatus to the first and second hearing instruments uses a field strength in the range from −50 dBμA/m in 10 m distance to −5 dμBA/m in 10 m distance for the transmission link.

16. A method of receiving a telephone call in a binaural hearing aid system including first and second hearing instruments each adapted for being worn in or at an ear of a user from a remote telephone apparatus via a local telephone apparatus adapted for being held by the user, the method comprising:
establishing a short range digital, low-power link from the local telephone apparatus to the first and second hearing instruments for forwarding a sound signal from the remote telephone apparatus to the first and second hearing instruments when the local telephone and one of the hearing instruments are positioned within a certain distance of each other; and receiving audio data of a signal from the local telephone apparatus by at least one of the first and second hearing instruments;

creating an inter-instrument wireless link between the first and second hearing instruments; and forwarding said audio data from one of the hearing instruments to the other of the hearing instruments through the inter-instrument wireless link.

17. A method according to claim 16 wherein the link from the telephone apparatus to the first and second hearing instruments is uni-directional.

18. A method according to claim 17 wherein the link from the telephone apparatus to the first and second hearing instruments is an inductive communication link.

19. A method according to claim 17 further comprising:

using a microphone of the local telephone apparatus for picking up a sound signal from the user and forwarding the sound signal from the user to the remote telephone apparatus.

20. Use of a hearing aid system according to claim 1.

21. A hearing aid system according to claim 1 wherein the hearing instrument is adapted to receive and play the sound from the telephone directly into the ear of the wearer of the first or second hearing instrument, when the telephone apparatus and the first or second hearing instrument are brought within a predetermined distance from each other.

22. A hearing aid system according to claim 1 wherein the system is adapted to automatically activate an appropriate hearing instrument program when a signal from the telephone apparatus is received.

23. A hearing aid system according to claim 22 wherein said hearing instrument program comprises a combination of parameter settings specifically optimized to the frequency range of the telephone signal.

* * * * *